Nov. 18, 1958  E. V. McHUGH  2,860,444
MINNOW VENDER
Filed May 7, 1957  2 Sheets-Sheet 1
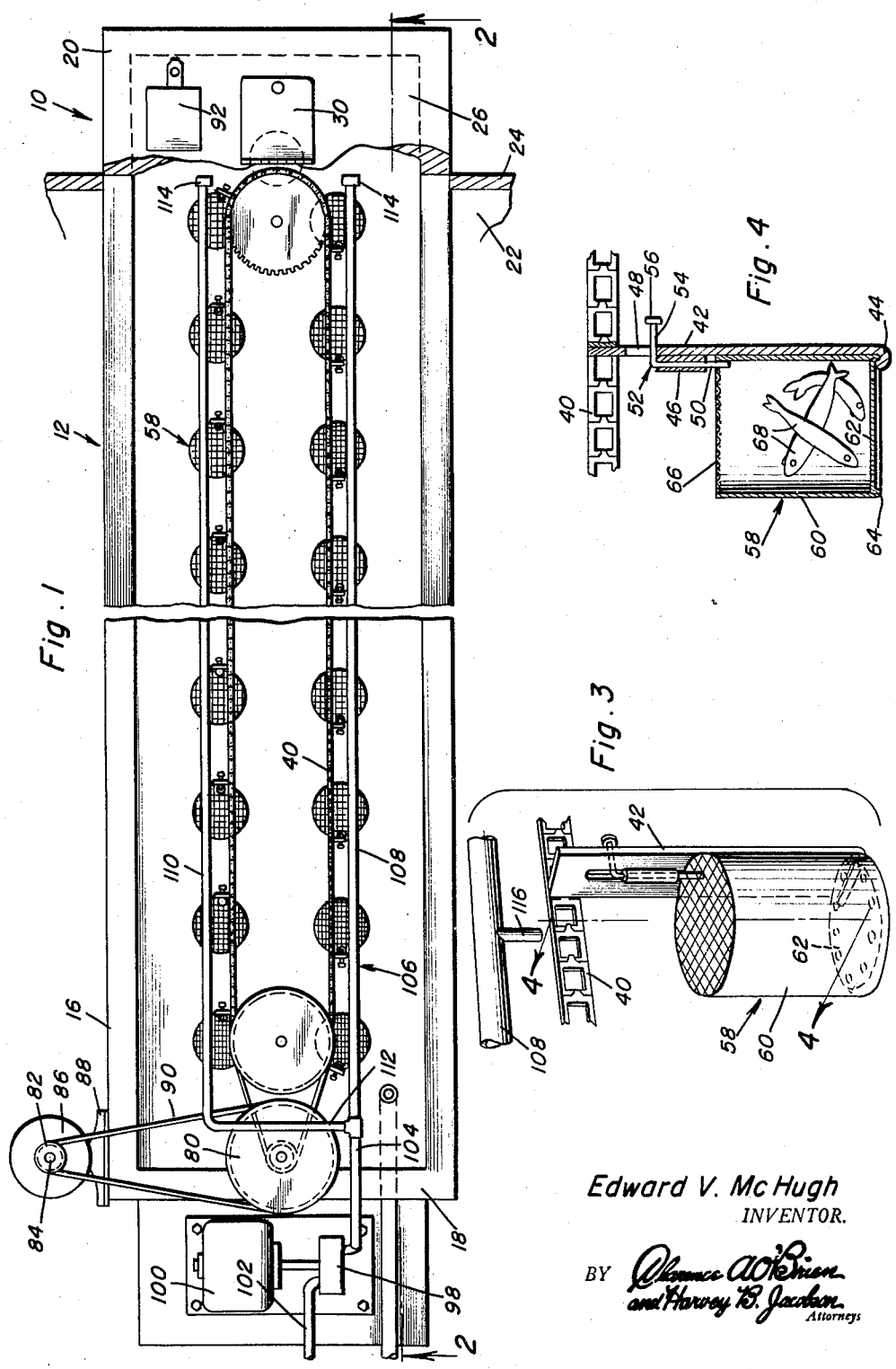
Edward V. McHugh
INVENTOR.

Nov. 18, 1958   E. V. McHUGH   2,860,444
MINNOW VENDER
Filed May 7, 1957   2 Sheets-Sheet 2
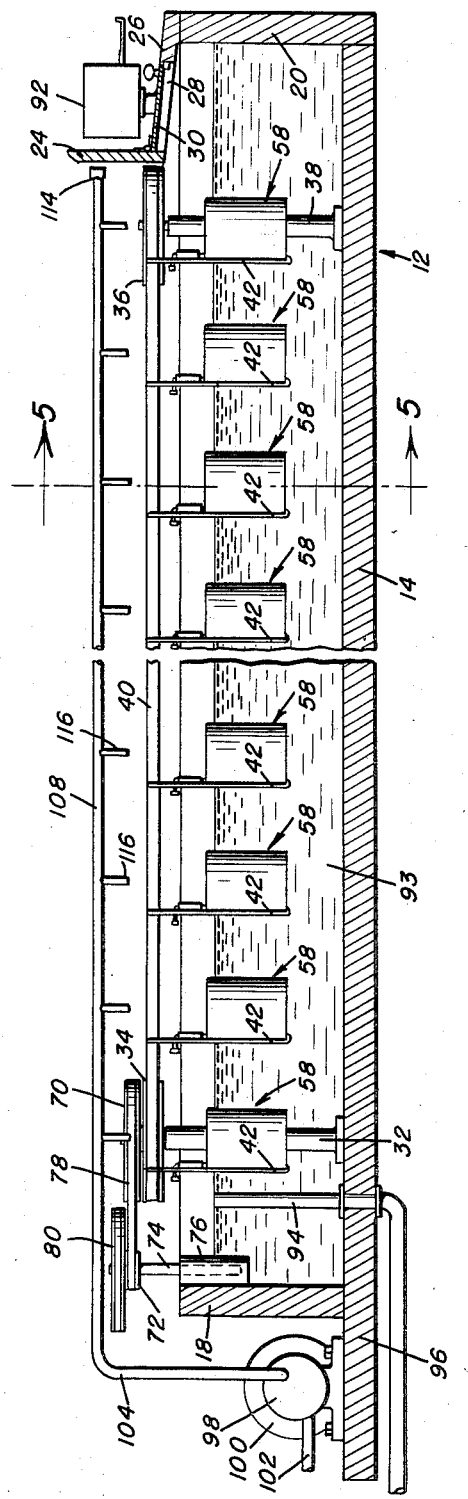
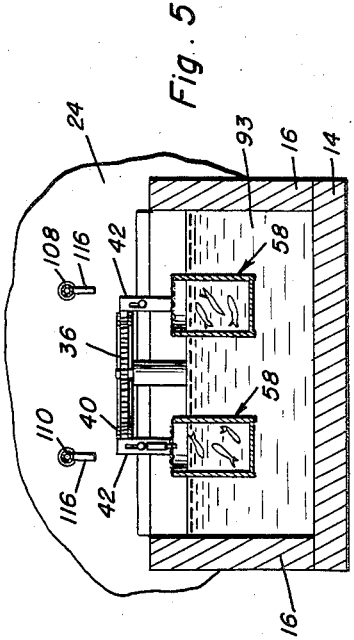
Edward V. McHugh
INVENTOR.

United States Patent Office 2,860,444
Patented Nov. 18, 1958

2,860,444

MINNOW VENDER

Edward V. McHugh, Mitchell, S. Dak., assignor of forty-nine percent to Frank Winner and H. R. Kibbee, Mitchell, S. Dak.

Application May 7, 1957, Serial No. 657,559

7 Claims. (Cl. 43—56)

This invention relates in general to new and useful improvements in dispensing machines, and more specifically to an improved dispenser for live bait and the like.

There have been devised dispensers for all types of thing including, e. g., ice cream, milk, soft drink, and stamps. However, little has been done in the field of dispensing wherein a live product is involved, particularly fish or other products which must be retained under water.

It is therefore, the primary object of this invention to provide an improved vender which is especially designed for vending live fish, particularly fish bait in the form of minnows.

Another object of this invention is to provide an improved vender for minnows, the vender being in the form of a tank partially filled with water in which containers for the minnows are partially submerged there being provided means for aerating the water of the tank, the containers for the minnows being mounted on an endless conveyor and being movable into alignment with a dispensing opening in a cover for the tank in response to the depositing of a coin within a coin actuated operator.

Another object of this invention is to provide an improved aeration system for a minnow vender, the aeration system including a piping system disposed in overlying relation to a plurality of containers for minnows and including nozzles normally aligned with the containers for providing a spray of fresh water into the containers.

A further object of this invention is to provide an improved method of attaching containers for minnows and other articles to be dispensed to a conveyor, the conveyor including a hanger for each container, the hanger terminating at its lower end in an upwardly directed hook in which there is engaged a depending lip on the container, and there being carried by the upper portion of the hanger a releasable fastener which is engaged with the upper part of the container for retaining it in engagement with the hanger.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the vender which is the subject of this invention and shows the general details thereof, a major portion of the cover for the vender being broken away and shown in section in order to clearly illustrate the arrangement of the conveyor within the tank;

Figure 2 is a longitudinal sectional view taken substantially upon the plane indicated by the section line 2—2 of Figure 1, and shows further the details of the vender;

Figure 3 is an enlarged fragmentary perspective view showing generally the details of mounting of a container on the conveyor and the relationship of the aerating means with respect to the container;

Figure 4 is an enlarged fragmentary sectional view taken substantially upon the plane indicated by the section line 4—4 of Figure 3 and shows further the details of the connection between the container and the conveyor, and Figure 5 is a transverse sectional view taken substantially upon the plane indicated by the section line 5—5 of Figure 2 and shows further the details of the vender.

Referring now to the drawings in detail, it will be seen that there is illustrated the vender which is the subject of this invention, the vender being referred to in general by the reference numeral 10. The vender 10 includes an elongated tank 12. The tank 12 includes a bottom wall 14, elongated side walls 16, an end wall 18 and an end wall 20.

The tank 12 is illustrated as being mounted within a room 22 which includes a vertical wall 24 through which a small portion of the tank 12 projects. That portion of the tank 12 projecting beyond the wall 24 is closed by a cover 26. The cover 26 defines a dispensing area for the vender 10 and includes a discharge opening 28, as is best shown in Figure 2, which is normally closed by a door 30. While a major portion of the tank 12 is illustrated as being disposed within a separate room 22, it is to be understood that if it is desired, the entire vender 10 may be mounted in one room. In such an instance, in lieu of the room 22 enclosing a major portion of the tank 12, the tank 12 would have a cover (not shown) which would extend over the entire top thereof.

Mounted within the tank 12 adjacent the end wall 18 is a standard 32 which has mounted for rotation on the upper part thereof a drive sprocket 34. The drive sprocket 34 is centrally located and is aligned with an idler sprocket 36 carried by a standard 38 extending upwardly from the bottom wall 14 adjacent the end wall 20. Entrained over the sprockets 34 and 36 is a horizontally disposed endless conveyor chain 40. As is best shown in Figures 3 and 4, the endless conveyor chain 40 has secured thereto at spaced intervals depending hangers 42. Each of the hangers 42 is disposed at one side of the conveyor chain 40 and is provided at the lower end thereof with an upwardly open hook 44. Secured to that face of the hanger 42 from which the hook 44 projects is a vertical sleeve 46, the sleeve 46 being mounted on the upper part of the hanger 42. Disposed in the hanger 42 above the sleeve 46 is a vertical slot 48. Mounted within the sleeve 46 for vertical sliding movement is a vertical portion 50 of a releasable fastener 52. The fastener 52 includes a horizontal portion 54 which extends through the slot 48 and which terminates in a head 56 to facilitate the manipulation thereof.

Carried by each hanger 42 is a container 58. Each container 58 includes a vertical body portion 60 which has the lower end thereof closed by a bottom wall 62. The connection between the bottom wall 62 and the body portion 60 is in the form of a depending lip 64 which is engaged with the hooks 44, as is best illustrated in Figure 4. The upper end of the container 58 is closed by means of a screen 66. Disposed within the container 58 are minnows 68 to be dispensed. It is to be understood that other types of live seafood and the like may be stored within the container 58.

Normally the container 58 is retained in place on the hanger 42 by means of the vertical portion 50 of the fastener 52 engaging down through the screen 66 and retaining the body portion 60 in face to face relation with the lower part of the hanger 42. However, when the fastener 52 is moved upwardly, the container 58 is released and may be removed from the hanger 42.

In order to facilitate the dispensing of a container 58, there is connected to the drive sprocket 34 a pulley 70. The pulley 70 is aligned with a sprocket 72 mounted on a shaft 74. The shaft 74 is in turn carried by a support 76 secured to the upper part of the end wall 18. Entrained over the pulleys 70 and 72 is a drive belt 78.

Connected to the pulley 72 is a pulley 80. The pulley 80 is aligned with a pulley 82 carried by an armature shaft 84 of an electric motor 86. The electric motor 86 includes a base 88 which is mounted on one of the side wall 16 adjacent the end wall 18. The pulley 80 is connected to the pulley 82 by means of a drive belt 90.

Carried by the cover 26 is a coin actuated operator 92. The operator 92 will be of any conventional type which will control the operation of the electric motor to permit limited operation thereof. The operator 92 will be connected to the electric motor 86 for the controlling thereof. Thus when a coin is inserted in the coin actuated operator 92, the electric motor 86 is driven for a time sufficient for one of the containers 58 to be moved into alignment with the dispensing opening 28. Then by pivoting the door 30 to an upper position, access to the interior of the tank is obtained. Then the party involved may reach into the tank 12, release the fastener 52 and disengage the container 58 aligned with the dispensing opening 28.

As is best shown in Figure 2, the tank 12 is partially filled with water 92. The depth of the water 92 is such that all except the upper part of each of the containers 58 is submerged therein. The depth of the water 92 is maintained at a constant level by means of an overflow pipe 94.

In order that the minnows 68 or other live seafood may be retained in a live state, there is carried by an extension 96 of the bottom wall 14 a pump 98 which is driven by an electric motor 100. The pump 98 has an inlet pipe 102 which is connected to a fresh water supply. Connected also to the pump 98 is an outlet pump 104 which is part of piping which is best referred to in general by the reference numeral 106 and is best shown in Figure 1. The piping 106 is aligned with the endless chain 40 and includes a pair of main pipes 108 and 110 which have their ends adjacent the end wall 18 interconnected by a transverse pipe 112. Connected to the pipes 108 and 110 is the pipe 104. The opposite ends of the pipes 108 and 110 are closed by end closures 114.

As is best shown in Figures 2, 3 and 5 in particular, depending from each of the pipes 108 and 110 is a plurality of nozzles 116. The nozzles 116 are so spaced whereby they are aligned with the containers 58. Thus a continuous spray of fresh water is directed down through the containers 58 while awaiting to be dispensed. This insures proper aeration of the water 92 and provides the water with sufficient oxygen for the proper living conditions for the minnows 68.

Although the pump 98 and motor 100 are generally used, in the event there is provided a pressurized fresh water supply, the pump 98 and the motor 100 may be omitted. The pressure source of the fresh water will be sufficient to properly supply the tank 12 with aerated water.

From the foregoing, it will be readily apparent that there has been devised a dispenser for minnows, live bait or other live seafood which is of such a nature whereby the operation thereof is automatic and at the same time there may be dispensed therefrom the minnows or other type of live fish. Further, there has been devised a simple method of connecting the containers for the minnows to the conveyor so that the containers may be readily removed from the conveyor for the proper dispensing of the minnows.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vender for live bait and the like, said vender comprising an elongated tank, a cover on said tank, said cover having a dispensing opening, a conveyor mounted within said tank, water within said tank, a plurality of containers at least partially submerged in said water and suspended from said conveyor, and means connected to said conveyor for operating said conveyor to progressively align said containers with said dispensing opening for removal through said dispensing opening.

2. A vender for live bait and the like, said vender comprising an elongated tank, a cover on said tank, said cover having a dispensing opening, a conveyor mounted within said tank, water within said tank, a plurality of containers at least partially submerged in said water and suspended from said conveyor, and means connected to said conveyor for operating said conveyor to progressively align said containers with said dispensing opening for removal through said dispensing opening, said means including a drive unit connected to said conveyor, and a coin controlled operator means connected to said drive unit for controlling the operation of said drive unit.

3. A vender for live bait and the like, said vender comprising an elongated tank, a cover on said tank, said cover having a dispensing opening, a conveyor mounted within said tank, water within said tank, a plurality of containers at least partially submerged in said water and suspended from said conveyor, means connected to said conveyor for operating said conveyor to progressively align said containers with said dispensing opening for removal through said dispensing opening, and means for aerating said water.

4. A vender for live bait and the like, said vender comprising an elongated tank, a cover on said tank, said cover having a dispensing opening, a conveyor mounted within said tank, water within said tank, a plurality of containers at least partially submerged in said water and suspended from said conveyor, means connected to said conveyor for operating said conveyor to progressively align said containers with said dispensing opening for removal through said dispensing opening, and means for aerating said water, said last mentioned means including a piping system aligned with said conveyor, said piping system including a plurality of nozzles aligned with said containers for directing a spray of water thereinto.

5. A vender for live bait and the like, said vender comprising an elongated tank, a cover on said tank, said cover having a dispensing opening, a conveyor mounted within said tank, water within said tank, a plurality of containers at least partially submerged in said water and suspended from said conveyor, means connected to said conveyor for operating said conveyor to progressively align said containers with said dispensing opening for removal through said dispensing openings, said conveyor including a plurality of hangers, each of said hangers having an upwardly directed hook at the lower end thereof, each of said containers having a depending lip engaged with said hook, and a releasable fastener carried by an upper part of said hanger for retaining said container on said hanger.

6. A vender for live bait and the like, said vender comprising an elongated tank, a cover on said tank, said cover having a dispensing opening, a conveyor mounted within said tank, water within said tank, a plurality of containers at least partially submerged in said water and suspended from said conveyor, means connected to said conveyor for operating said conveyor to progressively align said containers with said dispensing opening for removal through said dispensing opening, said conveyor including a plurality of hangers, each of said hangers having an upwardly directed hook at the lower end thereof, each of said containers having a depending lip engaged with said hook, and a releasable fastener carried by an upper part of said hanger for retaining said container on said hanger, said containers each having a screen closing the upper end thereof, said fasteners being engaged in said screen.

7. A vender for live bait and the like, said vender comprising an elongated tank, a cover on said tank, said cover having a dispensing opening, a conveyor mounted within said tank, water within said tank, a plurality of containers at least partially submerged in said water and suspended from said conveyor, means connected to said conveyor for operating said conveyor to progressively align said containers with said dispensing opening for removal through said dispensing opening, and means for aerating said water, said last mentioned means including a piping system aligned with said conveyor, said piping system including a plurality of nozzles aligned with said containers for directing a spray of water thereinto, and an overflow pipe for regulating the level of said water within said tank.

References Cited in the file of this patent

UNITED STATES PATENTS

| | | |
|---|---|---|
| 1,272,894 | Bean | July 16, 1918 |
| 2,627,362 | Balaz | Feb. 1953 |
| 2,767,507 | Chiambretti | Oct. 23, 1956 |
| 2,791,862 | Shook | May 14, 1957 |